United States Patent

[11] 3,574,970

[72] Inventor Cornelis Geytenbeek
  Woodside, South Australia, Australia
[21] Appl. No. 737,932
[22] Filed June 18, 1968
[45] Patented Apr. 13, 1971
[73] Assignee Alain Meilland
  Cap d'Antibes, France
[32] Priority June 19, 1967
[33] Australia
[31] 23290/67

[54] METHOD OF PROPAGATING ROSES BY GRAFTING
  6 Claims, 7 Drawing Figs.
[52] U.S. Cl. .................................................. 47/7
[51] Int. Cl. .................................................. A01g 1/06
[50] Field of Search .......................................... 47/5.5—7, 58

[56] References Cited
FOREIGN PATENTS
4,080 1896 Great Britain ............... 47/6
OTHER REFERENCES
American Gardening, Long et al., N.Y., 1892, pp. 535, 536 and 556 relied on, copy in Gp.337, 47–6.
U.S.D.A. Farmer's Bulletin No. 471, 1924, pp. 3—5 relied on, copy in Gp.337, 47–7.
Plant Propagation, Mahlstede et al., N.Y., 1957, page 266 relied on, copy in Gp.337, Examr's Desk.
American Rose Annual, 1963, Columbus, Ohio, pp. 73–76 relied on, copy in Gp.337, Examiner's Desk.

Primary Examiner—Robert E. Bagwill
Attorney—Brumbaugh, Graves, Dohohue and Raymond ABSTRACT: A method of propagating roses by grafting as a veneer onto cuttings of understock in which the understock cuttings have been unrooted, uncallused and de-eyed.

Patented April 13, 1971 3,574,970
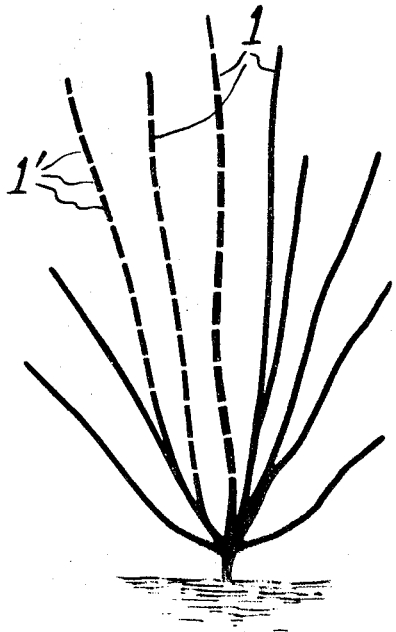
Fig. 1
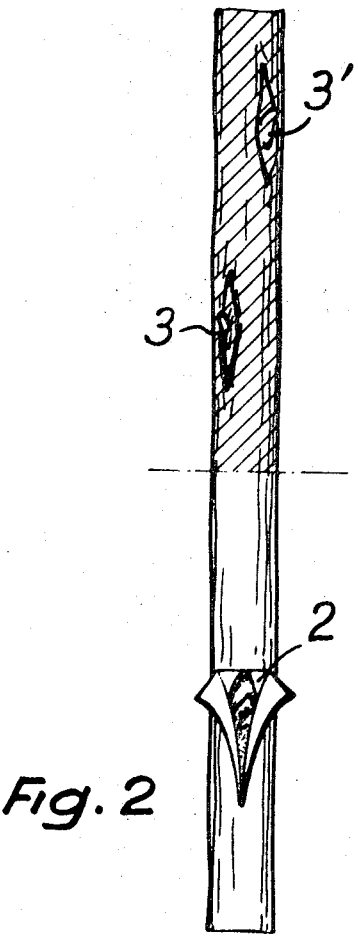
Fig. 2
Fig. 3a  Fig. 3b    Fig. 3d  Fig. 3e
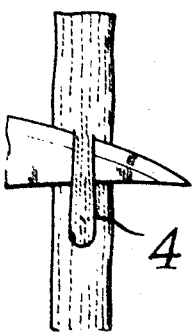 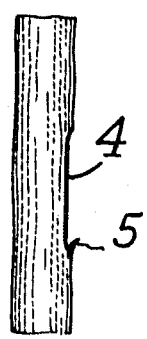 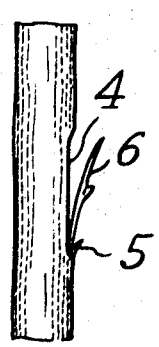 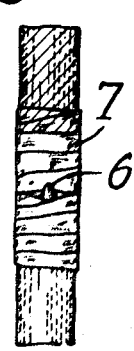
Fig. 3c
INVENTOR
CORNELIS OEYTENBEEK
BY
Brumbaugh, Free, Graves & Donohue
his ATTORNEYS

METHOD OF PROPAGATING ROSES BY GRAFTING

It is well known that for many horticultural reasons it is useful, instead of cultivating the different varieties of roses on their own roots, to use an understock as a connection between the soil and the bud (or eye) of the varieties, each rose plant subsequently sold reproducing exactly the original variety, but on a different root system (asexual reproduction).

The understocks used are of very varied types. As regards varieties intended for the production of cut flowers, understocks grown from cuttings are particularly favored, for example the understock known as "Indica major (or Rosa Chinensis or Rosa Odorata), because of its great vigor, its ability to grow in all seasons, its tolerance of soils with very different pH, and its ability to be cultivated under glass during the winter. On the other hand, propagation in the field of varieties grafted on to Indica major is difficult in certain latitudes (Northern Europe).

The invention relates to propagation of rose varieties by grafting on to an understock such as Indica major, using a method which is different from those previously known and which facilitates the grafting operation proper and improves the conditions of cultivation of the plant when grafted.

The method embodying the invention is related to the known methods of grafting on to Indica major cuttings and can also be applied to cuttings from other understocks.

It is based on the—at first sight surprising—discovery that development of the graft does not necessitate the preservation of existing eyes or buds on the unrooted cutting used as the understock. As the result of this discovery, the method has the following main advantages, which will be discussed below, over conventional methods: a reduction in the length of the cuttings taken from an understock such as Indica major; a reduction in the time taken to obtain a well-developed rose plant of the variety grafted; simplification of the grafting operations and the possibility of mechanizing them.

The method will be described as follows, with reference to the accompanying drawings.

1. The cuttings must preferably be taken from dormant understocks.

2. Since the method does not require the preservation of any eye on the cutting, the twigs (FIG. 1) of the understock can be completely de-eyed before cutting the lengths 1' to form the cuttings on to which an eye of the variety propagated will be grafted. With the known method, these lengths were at least 30 cm. long (FIG. 2), since the site of at least one eye 3 and possibly two eyes 3' on the understock had to be retained above the grafting point 2. With the new method, the lengths can be shortened by 10 cm., with the result that a larger number of cuttings can be taken from a given plant.

3. Although completely de-eyed, these cuttings can be stored in a cool room at a temperature of +1° until grafting time. However, they should be sterilized by soaking in a solution containing a fungicide, so that they remain completely clean and healthy during storage.

4. The grafting operation proper is carried out as follows.

In the known method of grafting on to Indica major cuttings, which requires skilled labour to give a high yield and a good percentage take, the bark of the cutting must be raised in order to insert the shield bearing the eye or bud of the variety propagated. This operation can only be carried out when the cutting is actively growing, i.e. about 5 or 6 months after it is planted, since otherwise the bark could not be loosened from the wood after the incision is made. According to an essential feature of the invention, on the other hand, the graft can be carried out on an inert, i.e. dormant, cutting. For this reason the method of grafting used ("veneering") is known but has never been used, except on growing plants, although it can be applied particularly well to unrooted, uncallused cuttings "on the table" and can be carried out by unskilled persons. It is illustrated in FIGS. 3a to 3e of the accompanying drawings.

a. A cut 4 (FIG. 3a) is made in the understock cutting;
 b. A small incision is formed at the base of the cut 4, to make a small tongue 5 (FIG. 3b);
 c. A graft cutting 6 is taken of the variety to be propagated, this cutting having an eye and a portion of bark (FIG. 3c) shaped like a shield approximately the same size as the cut 4 in the understock cutting;
 d. This graft cutting 6 is applied to the cut portion 4, where it is held temporarily by the tongue 5 (FIG. 3d);
 e. This graft cutting is then held in place by suitable means, e.g. a tie 7 (FIG. 3e).

5. As already stated, an important feature of the method embodying the invention is that grafting is carried out on unrooted cuttings, not on planted cuttings, and can therefore be mechanized. After grafting, the cuttings are soaked in a bath of melting wax or of some other substance which is not poisonous to plants and which can provide a complete seal for the top cut and for the cut made for the graft. It will be noted that the cuttings have a base and a top, and must not be planted upside down.

6. The grafted cuttings are cultivated as follows:
 a. Various materials may be used as the culture medium (e.g. sand, perlite, vermiculite, peat), provided that they are neutral, aerated and able to retain a fairly large quantity of water. The grafted cuttings are inserted into one of these materials at their bases, which are free of wax.
 b. The longer the cuttings are expected to stay in this artificial medium, the lower should be the planting density. The average densities are likely to be between 500 and 800 cuttings per $m^2$.
 c. All these operations, including those in the first stage in cultivation, take place inside buildings or glasshouses. Although the cuttings might be cultivated outside at some times of the year, indoor cultivation (in glasshouses, buildings) is preferable because it permits better control of climatic conditions:

soil temperature     16° to 18°
 ambient temperature  20° to 22°
 humidity             80 percent d. Cultivation in this artificial medium continues for approximately 1 month, during which all the grafted buds develop and the scar callus which will produce the roots after transplanting forms at the base of each cutting.

Transplanting may be carried out in two ways: into nursery rows, in order, after a few months, to have well developed plants, i.e. plants formed of several shoots ("formed plants"); or into a glasshouse or even a garden using immediately the grafted cuttings ("unformed plants") which, since they have to put out and develop their roots in situ, can be bought by the glasshouse or garden owner more cheaply than rooted ("formed") plants.

e. Approximately 6 months after grafting, the tip of the cutting (the portion hatched in FIG. 3e), is removed from the growing plant. Because this tip is removed and the cut thus made is covered, with a waxy isolating substance, infection is prevented and a desirable scar callus is formed, which distinguishes a plant grafted in this manner from a plant which has simply been budded by conventional grafting methods.

The method according to the invention, as described above, has the following advantages.

I claim:

1. A method of propagating roses comprising bud-grafting a selected scion onto a stem fragment of a selected understock, said fragment being dormant uncallused unrooted, and de-eyed.

2. The method of claim 1 wherein the fragments are disinfected prior to grafting.

3. The method of claim 1 wherein the completed graft is coated with wax.

4. The method of claim 1 wherein the completed grafting is placed in an artificial medium for root formation.

5. The method of claim 1 wherein the scion is attached to the understock by the veneering method according to which a shield containing an eye of the rose to be propagated is tied to the portion of the understock which has been prepared to receive it.

6. The method set forth in claim 1 wherein the understock is Indica major.